June 2, 1942.  A. R. PEZZILLO  2,285,050
COMBINED MOTOR AND PUMP
Filed June 19, 1940  2 Sheets-Sheet 2
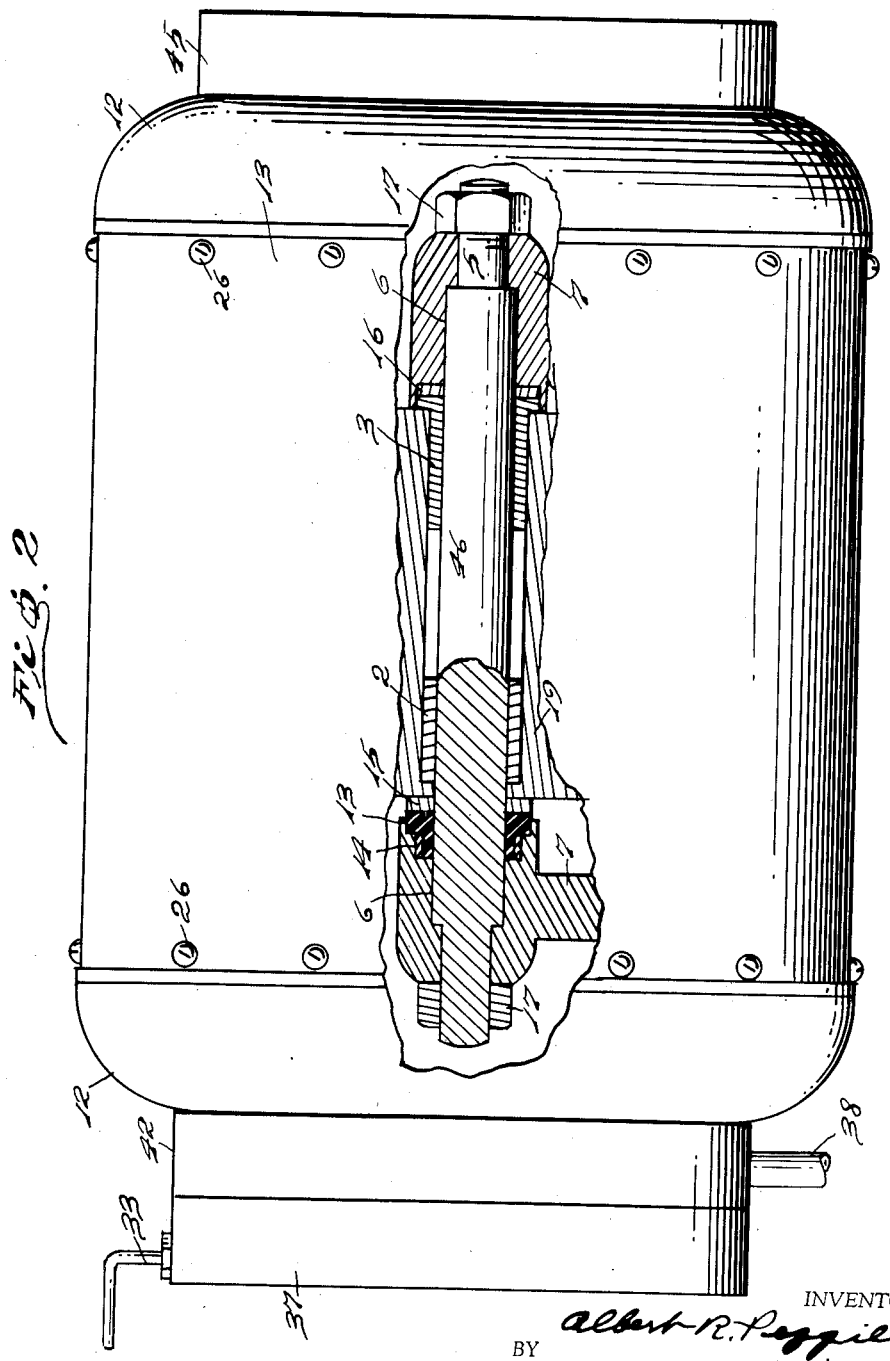
INVENTOR.
Albert R. Pezzillo
BY Herbert S. Fairbanks
ATTORNEY Patented June 2, 1942

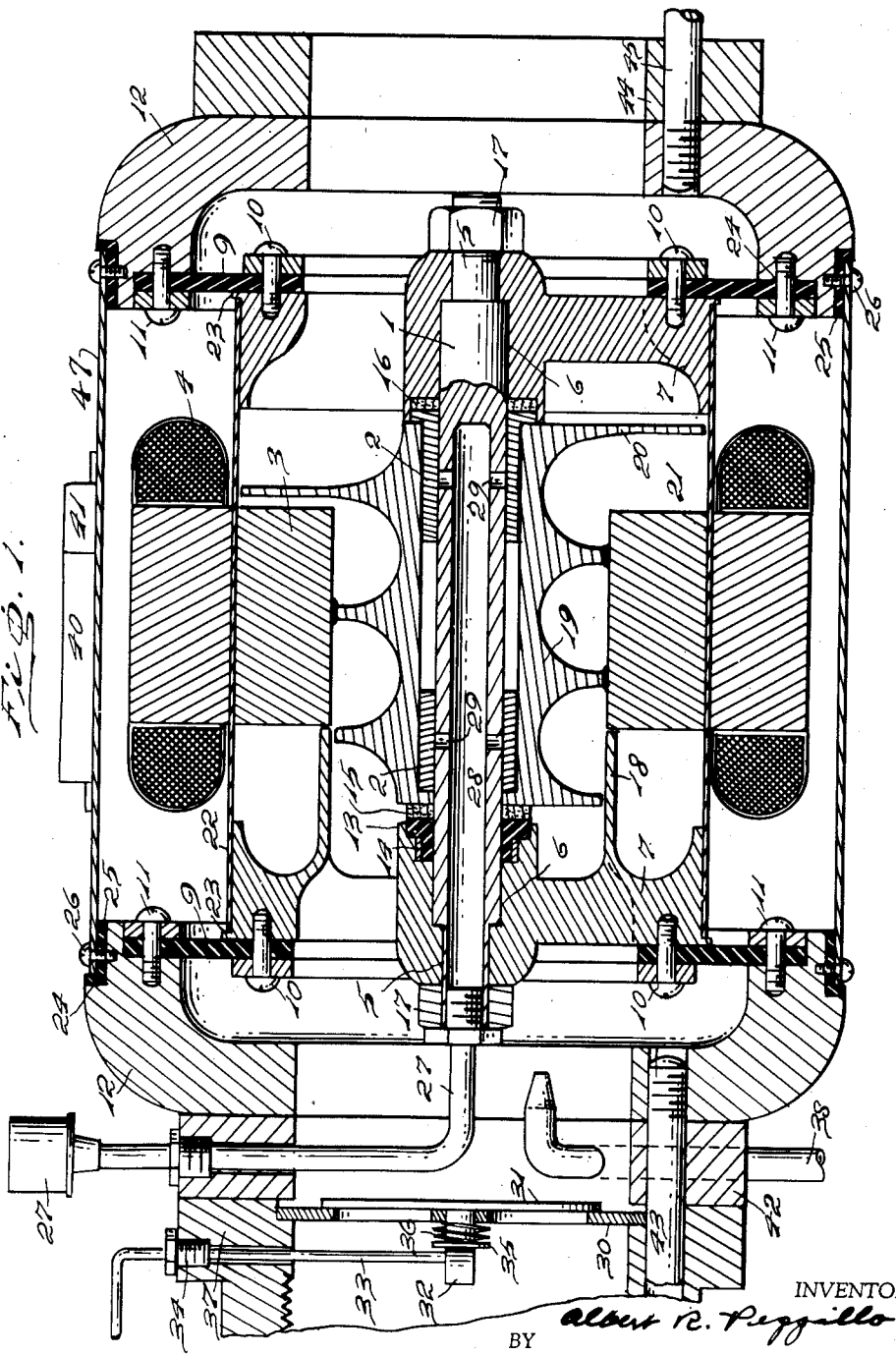

UNITED STATES PATENT OFFICE 2,285,050

COMBINED MOTOR AND PUMP

Albert R. Pezzillo, Philadelphia, Pa.

Application June 19, 1940, Serial No. 341,294

11 Claims. (Cl. 103—87)

One object of this invention is to devise a novel simplified and compact motor and pump unit which can be economically manufactured from a minimum of parts, and which in operation will be silent with the rotor and stator yieldingly supported within the stator housing, and in which the stator windings will be effectively sealed in a novel manner from the fluid or fluids being circulated.

A further object of the invention is to provide for proper lubrication of the bearings for the rotor.

A further object of the invention is to provide novel valve mechanism wherein the valve will automatically open when the motor starts and close when the motor stops.

A further object of the invention is to provide for the proper mixing and circulation of different fluids, such as for example the feed of fuel and air to an oil burner.

A further object of the invention is to obtain increased efficiency and durability in a motor driven circulating pump.

With the above and other objects in view as will hereinafter clearly appear, my invention comprehends a novel combined motor and pump which is silent and wherein vibration is substantially eliminated.

It further comprehends a novel motor, pump unit in which the rotor and stator are yieldingly supported within the stator housing, with the yielding support preferably effective to seal and isolate the stator windings from the fluid being circulated.

It further comprehends novel means for mounting the rotor and for lubricating its bearings.

It further comprehends a novel construction and arrangement of a flow valve at the intake end of the pump.

Other novel features of construction and advantage will hereinafter appear in the detailed description and the appended claims.

For the purpose of illustrating the invention, I have shown in the accompanying drawings typical embodiments of it, which, in practice, will give satisfactory and reliable results. It is, however, to be understood that the various instrumentalities of which my invention consists can be variously arranged and organized and my invention is not limited to the exact arrangement and organization of these instrumentalities as herein set forth.

Figure 1 is a sectional elevation of a combined motor and pump embodying my invention.

Figure 2 is a side elevation, partly broken away of another embodiment of the invention.

Similar numerals of reference indicate corresponding parts.

Referring to the drawings:

Referring first to the embodiment seen in Figure 1, 1 designates a stationary shaft having bearings 2 on which a tubular rotor 3 is mounted to revolve within stator windings 4 of the motor. The shaft 1 is of reduced diameter at its ends as at 5 to be received in the differential bore 6 of end members 7 having openings 8 for the passage therethrough of the fluid being circulated. The end members 7 are in the form of castings yieldingly supported by rings 9 secured thereto by fastening devices 10 at the inner peripherial portions of the rings, and the outer peripherial portions of the rings 9 are secured by fastening devices 11 to the end housing members 12. The rings are preferably made of "Neoprene" or any other type of rubber like material which is not affected by oils or acid, and these rings may be reinforced by fabric, cord or other suitable tensile material.

The rotor carrying end member 7 at the intake end is recessed to receive a flanged "Neoprene" washer 13 with a metal ring 14 which binds the washer to the stationary shaft 1, and having the washer bearing against a carbon thrust member 15 which latter bears against the intake end of the rotor.

The end rotor carrying member 7 at the discharge end is recessed to receive a carbon washer 16 which bears against the rotor at the discharge end of the rotor. The shaft 1 is locked in position by nuts 17 bearing against the end members 7.

The rotor carrying member 7 at the intake end has a cylindrical extension 18 into which the intake end of the helical conveyor 19 of the rotor extends and in which it has a working fit. The discharge end 20 of the helical conveyor is of enlarged diameter and revolves in the chamber 21 to increase the pressure on the fluid being circulated. The peripherial portions of the end members 7 have a sealing plastic applied to them and a cylinder 22 of non-magnetic material is then forced over them to have a driving fit therewith and one of the end members 7 has an annular lip 23 to overhang the juxtaposed end of the cylinder.

The housing end members 12 have annular grooves 24 to receive "Neoprene" or similar gaskets 25 against which the housing cylinder 47 is sealed by fastening devices 26.

The bearings of the rotor are lubricated by a lubricant passing from an adjustable oil cup 27 of conventional design, through a tube 27 leading to a passage 28 in the shaft which passage has ports 29 leading to the bearings.

A pipe fitting 37 at the intake end is recessed to receive a valve seat 30 in the form of a spider having a hub through which the stem of a disc valve 31 extends to bear against a cam 32 on a manually rotatable shaft 33 having a stuffing box 34. The valve stem has a head 35 between which and the spider a spring 36 is interposed so that it tends to seat the valve.

Shaft 33 is preferably mounted in the pipe fitting 37 secured by bolts to the juxtaposed end housing member.

A pipe 38 leading from a source of fluid supply has its discharge end extending into the intake end in the direction of flow and is preferably provided with a controlling valve.

The motor is provided with a relay 40 to provide a high starting torque and with a conventional overload cut out 41.

The fitting 37 and a ring 42 are secured to the juxtaposed housing member 12 by bolts 43. A ring 44 is secured by bolts 45 to the other end member of the housing.

In the embodiment seen in Figure 2, the bearings are water lubricated instead of being oil lubricated, the lubricating mechanism seen in Figure 1 being omitted. The other features of construction are similar to those shown in Figure 1, and I have therefore for ease of explanation identified corresponding parts by the same reference characters.

In Figure 2, the stationary shaft 46 corresponding to the shaft 1, is solid and the bearings are lubricated by the fluid being circulated.

The operation will now be clear to those skilled in the art:

The motor and pump unit forms a fluid impelling or impelled device. If it is desired to operate the device as a flow meter, the impelling blade is driven by the fluid passing through the device. This causes the blade to revolve. The electrical resistance which is built up can be calibrated and indicated on a meter.

Considering my device as a pump or circulator, when the motor is energized the suction causes the flow valve to open and the helical blade rotating with the rotor causes the forward travel of the fluid and the enlarged diameter of the blade at the discharge end increases the pressure of the fluid.

When the motor is de-energized the valve spring closes the valve.

The suction created at the intake end causes a Venturi effect at the discharge end of the pipe 38 to cause a plurality of fluids from different sources to be mixed and circulated.

In some cases this pipe 38 and its adjuncts would be omitted.

The flow valve in many cases can also be dispensed with.

The helical impeller blade extends into a stationary bore at one or both ends a substantial distance. This distance is determined by the pitch of the blades, the use of a straight helical blade, a diverging blade and the pressure which it is to create.

By the employment of a yielding support for the rotor and stator, the vibration usually present in a device of this character is substantially eliminated, with a consequent reduction in noise which is a very valuable feature when the device is used for circulating water in a heating system. This yielding support is preferably formed of "Neoprene" suitably reinforced with fabric, cord, or other type of reinforcement so that while it floats the rotor and stator within the stator housing, it also serves to seal and isolate the stator windings from the fluid being circulated.

The cylinder of the inner casing has a high electrical resistance, carries the stator windings and contributes to isolate the stator from the fluid circulator. It also tends to reduce hum when an A. C. current for the motor is used.

Having thus described my invention, what I claim as new and desire to secure by Letters Patent is:

1. In a fluid impelling or impelled device, end casing members having an inlet and an outlet, a cylinder sealed with said members, a stationary shaft mounted in said end members, a tubular rotor rotatably mounted on said shaft, an impeller fixed to said rotor, an outer housing having an inlet and an outlet, and means to yieldingly support said end members from said housing.

2. In a fluid impelled or impelling device, end casing members having an inlet and an outlet and a stationary bore at the intake end, a cylinder sealed with said members, a shaft mounted in said end members, a tubular rotor mounted on said shaft, an impeller fixed to said rotor, and extending into said stationary bore, an outer housing having an inlet and an outlet, and "Neoprene" rings fixed to said end members and housing to yieldingly support said shaft and rotor.

3. In a fluid impelling or impelled device, end casing members having an inlet and an outlet, a cylinder sealed with said members to form an inner casing, a tubular rotor in said casing, a shaft carried by said end members and having bearings, an impeller rotatable on said bearings and fixed to said rotor, an outer housing having an inlet and an outlet, and means to yieldingly support said casing within said housing.

4. In a fluid impelling or impelled device, end casing members having an inlet and an outlet, a cylinder sealed with said members to form an inner casing, a tubular rotor in said casing, a shaft carried by said end members and having bearings, an impeller rotatable on said bearings and fixed to said rotor, an outer housing having an inlet and an outlet, a stator forming part of an electric motor between said inner casing and outer housing and having windings and means to yieldingly support said casing within said housing, said means also contributing to seal and isolate the stator windings from the fluid circulated.

5. In a fluid impelling or impelled device, end casing members having an inlet and an outlet, a cylinder sealed with said members to form an inner casing, a tubular rotor in said casing, an impeller fixed to said rotor, an outer housing having an inlet and an outlet, a shaft carried by the end members, having bearings on which the rotor is mounted, and having a passage leading through the shaft to the bearings, a stator between said inner casing and outer housing, forming part of an electric motor, and having windings, means to yieldingly support said casing within said housing, said means also contributing to seal and isolate the stator windings from the fluid circulated, and means to feed lubricant through said shaft to said bearings.

6. In a fluid impelling or impelled device, end casing members having an inlet and an outlet, a cylinder sealed with said members to form an inner casing, a tubular rotor in said casing, and journalled in said end members, an impeller carried by said rotor, an outer housing having an inlet and an outlet, a stator forming part of an electric motor, carried by said inner casing and means to yieldingly support said casing within said housing.

7. In a fluid impelling or impelled device, end casing members having an inlet and an outlet, a cylinder sealed with said members, a shaft mounted in said end members, a tubular rotor mounted on said shaft, an impeller fixed to said rotor, an outer housing having an inlet and an outlet, means to yieldingly support said end members from said housing, and means to introduce at the intake end of the housing a fluid from a different source than the fluid normally circulated by the impeller.

8. In a fluid impelling or impelled device, an outer housing having an inlet and an outlet, an inner casing having end members forming an inlet and an outlet, a shaft carried by said end members, an impeller on said shaft, carbon washers between said impeller and end members, a "Neoprene" washer between one of said carbon washers and its end member and fixed to said shaft, a tubular rotor fixed to said impeller, and means to yieldingly support said casing within said housing.

9. In a fluid impelling or impelled device, end casing members forming an inlet and an outlet, a cylinder sealed with said members, a rotor journalled in said end members, an impeller carried by said rotor, an outer housing, and means to yieldingly support said end members from said housing.

10. In a fluid impelling or impelled device, a stator forming part of an electric motor, end casing members forming an inlet and an outlet, a cylinder carrying said stator and sealed with said members, a rotor journalled in said end members, an impeller carried by said rotor, a housing, and resilient rings flexibly supporting said end members from said housing.

11. In a fluid impelling or impelled device, end members, a cylinder sealed with said end members, a rotor journalled in said end members, an impeller carried by said rotor, an outer member, a stator forming part of an electric motor and surrounding said cylinder, and resilient rings contributing to seal the stator from the rotor and supporting said end members from said outer member.

ALBERT R. PEZZILLO.